United States Patent Office 3,274,906
Patented Sept. 27, 1966

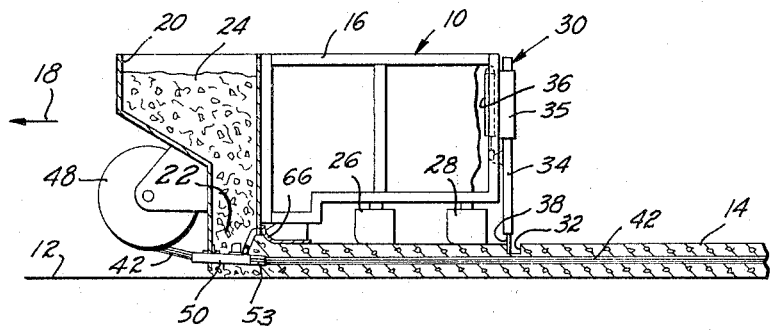
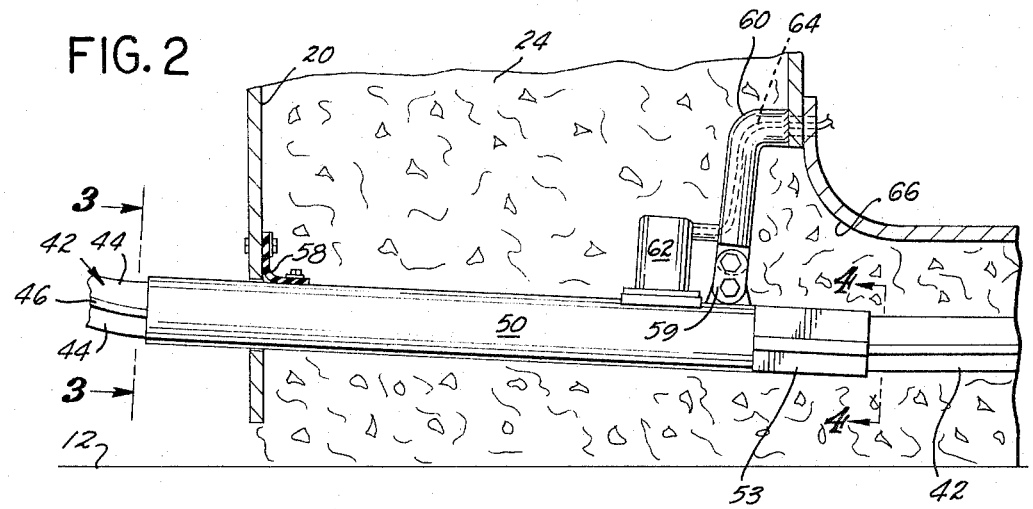
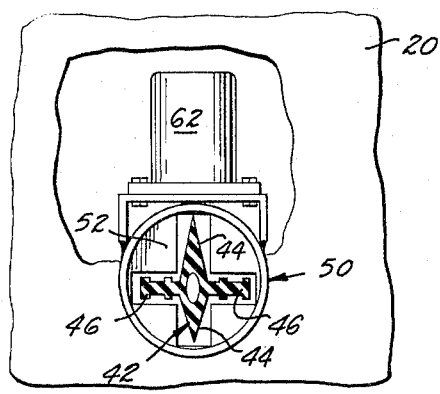
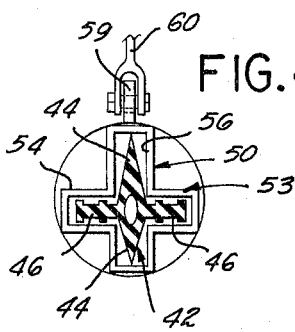

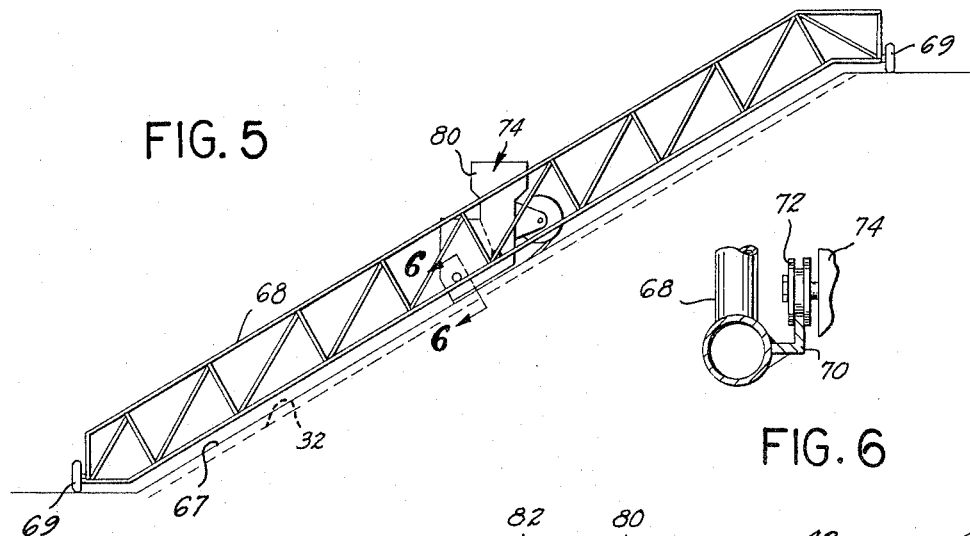
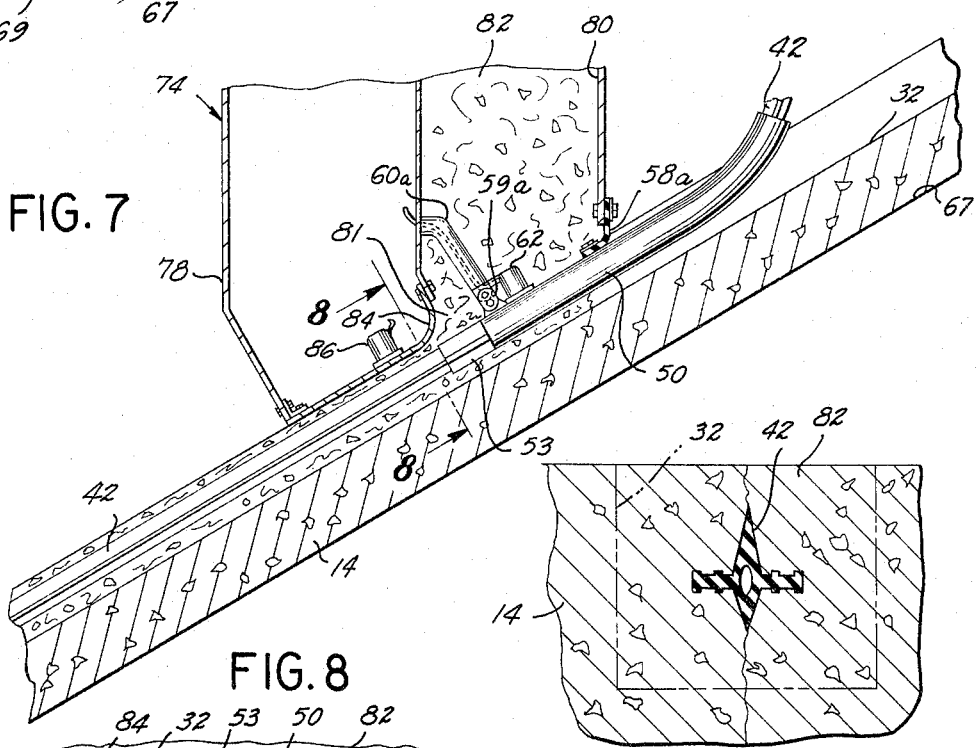
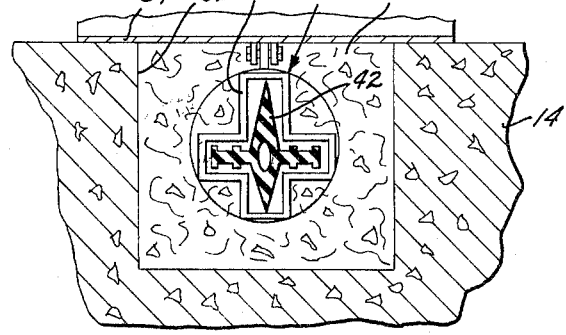

3,274,906
JOINT INSTALLATION APPARATUS
Lee Worson, Long Beach, and Robert F. Dill, Westminster, Calif., assignors to Edoco Technical Products, Inc., Long Beach, Calif., a corporation of California
Filed Dec. 9, 1963, Ser. No. 328,957
5 Claims. (Cl. 94—39)

The present invention relates to a joint installing method and apparatus, and more particularly to a method and apparatus for embedding an elongated joint insert in uncured concrete.

In the construction of modern highways, airport runways, irrigation canals and other structures characterized by comparatively large and unbroken expanses of concrete, provision must be made for thermal expansion and contraction of the concrete. Although a number of methods and devices have previously been utilized to provide appropriate joints for this purpose, the present invention is particularly concerned with joints established by utilizing embedded joint inserts of the type disclosed in United States Patent No. 3,023,681, issued March 6, 1962, for "Combined Weakened Plane Joint Former and Waterstop."

Installation of an embedded joint insert of the character described in the referenced patent provides a weakened plane joint in the plastic concrete, the concrete cracking along this weakened plane as it contracts during curing and hardening. However, the cracks at the surface of the concrete are barely perceptible and therefore offer comparatively little opportunity for erosion under the abrading effects of wear and the elements. Moreover, the character of the joint insert of the referenced patent is such that the resulting joint not only permits necessary concrete contraction and expansion, but also prevents water seepage downwardly through the concrete slab. Such seepage can easily destroy the prepared road bed or the like upon which a concrete slab rests. In the case of joints provided in the base and sloping side walls of concrete-lined irrigation canals, such water seepage also constitutes a steady loss of water. The amount of water lost in this manner is sufficiently great that it is a matter of serious concern to the water authorities involved.

The joint insert of the referenced patent is of generally cruciform configuration with the weakened plane joint defined by the substantially vertically disposed portions of the cruciform shape. The horizontal portions of the cruciform configuration provide the desired water seal and for this purpose are usually serrated or otherwise provided with surface interruptions to tightly grip and bond to the adjacent concrete slabs. With this arrangement, water descending downwardly through the joint is halted at the horizontal portions of the cruciform joint insert if the bond with the surrounding concrete is good and is absent voids and the like.

The rapid and proper installation of the cruciform joint insert has not been without difficulty. For example, present paving equipment for building concrete highways, irrigation canals, and aircraft runways operates at a comparatively high rate of speed and consequently utilizes a concrete "mix" which sets up or cures rather rapidly, particularly on hot days. This has made difficult the task of installing the aforementioned joint inserts since the horizontal portions thereof tend to impede any forcible insertion into the plastic, rapidly stiffening concrete.

One solution to this problem has been advanced in a co-pending United States patent application Serial No. 158,003, filed December 8, 1961, for "Method and Apparatus for Forming Joints in Concrete," invented by Lee Worson, one of the co-inventors of the present invention. In the method and apparatus of that patent application, a cruciform joint insert is deployed downwardly from a supply spool into a channel formed in the plastic concrete by a blade or scoop. The scoop moves the larger, heavier aggregates of the concrete to one side, clearing a channel for an insertion wheel which mounts the joint insert in a way such that the wheel bears upon the horizontal portions of the insert and presses them into the light aggregates and mortar which have generally by that time flowed into the channel. However, this method and apparatus requires disruption of the already laid plastic concrete to form the channel for the joint insert, and the concrete displaced in forming this path or channel must be leveled and finished subsequent to the joint insert installation. The channel formation, installation and finishing must all be accomplished rather quickly because of the rapidly curing concrete, particularly on hot days. Delay in this regard, as well as poor consolidation of the displaced concrete around the joint insert, has produced a number of poor joints which are characterized particularly by susceptibility to water seepage.

Therefore, it is an object of the present invention to provide a method and apparatus for installing a joint insert simultaneously with the pouring or laying of the fresh concrete on the prepared base or very shortly thereafter with minimum disruption and, in any case, with unique concrete consolidation by vibration. When the joint insert is installed simultaneously with the pouring of the concrete, there is no necessity for displacing freshly-laid concrete in order to provide a path or channel to receive the joint insert, the concrete in effect being poured about the joint insert as the joint insert is located in position.

Another object of the invention is to provide a method and apparatus of the aforementioned character utilizing an elogated joint insert laying tube having a passage therethrough for receiving the joint insert, and further having a rear end portion adapted for submergence in the plastic concrete so that as the concrete is poured the joint insert is deployed from the submerged end of the tube. The portion of the tube in advance of the main tube body is located in the path of the plastic concrete being poured, and thus occupies the space subsequently to be occupied by the joint insert, and without having to displace concrete already poured. In this regard, the portion of the tube in advance of the end from which the joint insert emanates preferably closely approximates the configuration of the joint insert being installed to thereby avoid a radical change in flow pattern of the concrete as it proceeds in a relative direction along the length of the tube. This assures good contiguity between the concrete and all surfaces of the joint insert, particularly the horizontal portions thereof.

A further object of the invention is the provision of a method and apparatus of the aforementioned character utilizing an elongated joint insert laying tube arranged to act as a plow to cut a channel in plastic concrete, and in combination with a smoothing means for filling the channel with the displaced concrete immediately subsequent installation of the joint insert in the channel, it being noted that this arrangement is best suited to the more fluid, less stiff states of concrete.

A further object of the invention is the provision of a method of the aforementioned character which is adapted for the installation of joint inserts not only in a longitudinal direction but along a transvers direction as well.

A further object of the invention is the provision of an apparatus of the aforementioned character in which the joint insert laying tube and a pressure element overlying the concrete surface are vibrated during installation of the joint insert to facilitate flow and consolidation of the plastic concrete about the tube and the joint insert, and also to facilitate movement of the joint insert out of the tube.

Yet another object of the invention is the provision of a method and apparatus of the aforementioned character in which means are provided for compressing the surface of the concrete immediately superjacent the joint insert laying tube wherby good consolidation of the concrete is provided about all of the surfaces of the horizontal and vertical portions of a cruciform joint insert.

Another object of the invention is the provision of a method and apparatus of the aforementioned character which is relatively inexpensive to practice and operate, and adapted to quickly and efficiently lay elongated flexible joint inserts.

Other objects and features of the invention will become apparent from consideration of the following description taken in connection with the accompanying drawings, in which:

FIG. 1 is a cross-sectional view of apparatus, forming a part of a paving machine, for providing a joint in concrete according to the present invention;

FIG. 2 is an enlarged longitiudinal cross-sectional view of the joint insert laying tube of the apparatus of FIG. 1;

FIG. 3 is a view taken along the line 3—3 of FIG. 2;

FIG. 4 is a view taken along the line 4—4 of FIG. 2, the concrete being omitted for clarity;

FIG. 5 is a front elevational view of another form of apparatus for providing a concrete joint in concrete, but particularly adapted for providing a transverse joint in the sloping side of an irrigation canal or the like;

FIG. 6 is a view taken along the line 6—6 of FIG. 5;

FIG. 7 is an enlarged longitudinal cross-sectional view of the joint insert laying tube of the apparatus of FIG. 5;

FIG. 8 is a view taken along the line 8—8 of FIG. 7, the concrete being omitted for clarity, and showing of the demarcation between the previously laid concrete and the concrete laid during installation of the joint insert;

FIG. 9 is a view similar to FIG. 8, but showing only the installed joint insert and the now merged, masses of concrete constituting the concrete from which the joint insert channel was formed, and the concrete laid in the channel during installation of the joint insert;

Figure 13:
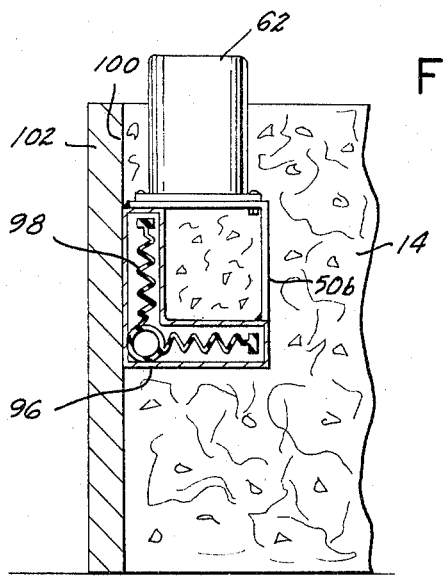
Figure 14:
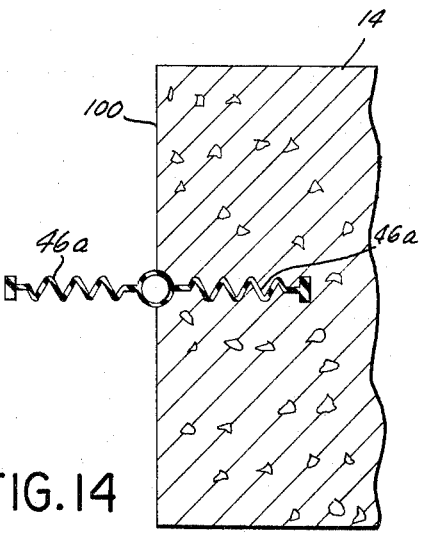

FIG. 13 is a fragmentary transverse cross-sectional view of a concrete slab construction joint having a joint seal being installed therein by a joint insert laying tube according to the present invention; and FIG. 14 is a fragmentary transverse cross-sectional view of the concrete slab construction joint of FIG. 13 after installation of the joint seal and removal of the concrete side form defining the construction joint.

Referring now to the drawings, and particularly to FIGS. 1 through 4, any conventional paving machine adapted to lay or pour continuous or monolithic concrete structure is indicated generally by the numeral 10, many of the details thereof being omitted for brevity since the bulk of the machine 10 does not form any part of the present invention. The paving machine 10 is suitably self-propelled or drawn over a prepared base 12 for laying the desired length of uncured or plastic laid concrete 14 to form a roadway, airport runway, flood control canal, irrigation canal, or the like. For this purpose the machine 10 includes a frame 16 movable in a longitudinal direction 18 and mounting or carrying a supply of concrete in a spreader box or hopper 20 which extends transversely of the paving machine 10 across the width of the structure to be paved or laid. The hopper 20 includes a discharge section 22 defining a path for fresh concrete 24 to follow in passing from the hopper 20 onto the prepared base 12. As will be apparent from the drawings, the discharged concrete is under a pressure head by reason of the vertical height of the concrete remaining in the hopper 20.

The particular method of providing a supply of fresh concrete is unimportant to the present invention and the hopper 20 is therefore shown merely by way of example. Likewise, details of the means for supporting the sides of the paving machine 10 laterally of the area to be paved, and details of the means for propelling the machine 10 are also omitted for brevity, particularly since a variety of equipment for these purposes is well known to those skilled in this art.

The machine 10 includes a pair of usual, transversely reciprocable floats or screeds 26 and 28, which spread and smooth the concrete issuing from the hopper 20, and also includes a transversely disposed channel-forming apparatus or guillotine 30 located at its rearward or downstream end for forming a transverse slot, path, or channel 32 in the plastic concrete 14 at suitable intervals of, for example, fifteen feet, depending upon the mass, type, and extent of concrete being laid.

The guillotine 30 is substantially identical to the insertion tool described in the above-identified copending patent application Serial No. 158,003 for forming a transverse path for a joint insert, and includes a pair of side support rods 34 which are slidable, respectively, within a pair of transversely spaced-apart, vertically disposed cylindrical guides 35, only one of which is illustrated in FIG. 1 and which are secured to the frame 16. Each rod 34 is movable by a fluid cylinder 36 which is secured to the paving machine frame 16 and actuated by any suitable source of fluid under pressure, as will be obvious.

Admission of fluid under pressure into the pair of cylinders 36 causes downward movement of the pair of support rods 34 and a transverse guillotine blade 38 extending between them to thereby form the transverse channel 32 in the plastic concrete 14. The width of the channel 32 is adjusted by adjusting the time the guillotine blade 38 is in the downward position thereof illustrated in FIG. 1. Insertion of the blade 38 into the concrete 14 is usually only a quick thrust since the rate of travel of the paving machine in the direction 18 is comparatively rapid. The blade 38 is raised by actuating the cylinders 36 in the opposite direction.

An elongated joint insert 42, as best illustrated in FIG. 9, is preferably made of flexible material which is cruciform in configuration in accordance with the teachings of the referenced Patent No. 3,023,681, and includes vertical portions 44 to establish the plane of weakness desired for subsequent joint formation. The insert 42 also includes laterally extending or horizontal portions 46 for close association with the surrounding concrete to tend to prevent water seepage downwardly past the insert 42.

The insert 42 is wound about a supply drum or spool 48 which is rotatably carried at the forward extremity of the paving machine frame 16, and thence passes downwardly from the spool 48 through the hollow interior of an elongated joint insert laying tube 50.

The major portion of the tube 50 is cylindrical and is closed at its forward end by a plate 52 having a cruciform opening 54 for guiding and orienting the insert 42, as best viewed in FIG. 3. An opposite, rearward end section or discharge portion 53 of the tube 50 has the comparatively thin walls thereof deformed or otherwise shaped to provide an external cruciform configuration and an internal cruciform passage 56. Thus, the cross-section of the tube 50 is primarily cylindrical except for the cruciform cross-section of the discharge portion 53.

This latter portion is made sufficiently long that the concrete 24 flowing from the hopper 20 has ample opportunity to flow into intimate contact with the cruciform exterior thereof. The concrete 24 then has only a slight change in path before contacting the insert 42 so that intimate contact with the insert 42 is greatly enhanced. However, the contiguity of contact is further enhanced by an arrangement of vibrating structure, as will next be described.

The forward extremity of the tube 50 is resiliently secured to the forward wall of the hopper 20 by a resilient strap 58 made of rubber or similar elastomeric material, the opposite extremity of the tube 50 being secured by a similar resilient strap 59 to a hollow support arm 60 which is fixed to the rearward wall of the hopper 20. This resilient mounting of the tube 50 permits the tube, and particularly the discharge portion 53 thereof, to be readily vibrated by a suitable electrically or fluid operated vibrator 62 mounted to the portion 53.

The vibrator 62 is illustrated as actuated by air under pressure which is fed through an air line 64 carried through the hollow interior of the support arm 60 to the exterior of the hopper 20. Vibration of the tube 50 facilitates flow of the concrete 24 past the discharge portion 53 and also facilitates the extruding or outward passage of the insert 42 from such portion 53. In this regard, it is noted that the discharge portion 53 is immediately adjacent the hopper discharge section 22.

A troweling pan, strike-off screed, or concrete smoothing element 66 is carried by the paving machine frame 16 superjacent the discharge portion 53, and is arcuately configured, that is, includes a downwardly and rearwardly directed portion, to apply a downward pressure upon the mass of concrete 24 flowing from the hopped 20 and about the tube 50. The concrete 24 is in excess at this point, and therefore available to fill voids and the like. As apparent from the drawings, the downwardly and rearwardly directed portion of the smoothing element 66 is located immediately above the discharge portion 53. The desired consolidation of the concrete in the voids by the downward pressure exerted by the element 66 is enhanced by vibration of the tube 50 by the vibrator 62 and also by the vibration transmitted thereto by the frame 16 incident to reciprocation of the screeds 26 and 28 and incident to other vibrations common to paving machines. Consequently, the concrete sandwiched between the element 66 and the tube portion 53 is thoroughly vibrated and consolidated about the portion 53 and the joint insert 42. This concept is important to an installed insert's proper water sealing properties.

Referring now to FIGS. 5 through 9, there is illustrated an apparatus which is adapted to lay transverse joint inserts 42 by utilizing the transverse channels 32 previously formed by the paving machine 10, as above-described. The sloping or inclined surface illustrated may, for example, be the sloping side 67 of an irrigation canal.

The apparatus includes an elongated, box-like framework 68 constituted of a plurality of intersecting tubular truss members for structural rigidity, the particular pattern of such connections and arrangements not being critical to the invention. The opposite extremities of the framework 68 are each rotatably supported by a pair of wheels 69, only one of each of the pairs of wheels being illustrated in FIG. 5. The framework 68 is thus movable longitudinally of the channels 32 and over the canal side 67. The framework 68 also includes a pair of confronting, longitudinally extending angles or tracks 70 at opposite sides to rollingly support pairs of grooved wheels 72 located on either side of a small installer 74. The installer 74 is thus adapted to traverse the length of the framework 68 while it rolls up and down the canal side 67.

A frame 78 of the installer 74 mounts a concrete supply, spreader box, or hopper 80 having a discharge section 81 defining a path for transferring a supply of fresh concrete 82 onto the prepared base or canal side 67.

Immediately below the hopper 80 is an elongated joint insert laying tube which, inasmuch as it is identical to the tube 50 described in connection with FIGS. 1 through 4, is also identified by the numeral 50. In this regard, other components will also be assigned numerals previously used to indicate identity of structure. Thus, the forward portion of the tube 50 projects out of the mass of concrete 82 and is resiliently suspended from the hopper 80 by a resilient strap 58a, and the opposite or rearward extremity of the tube 50 is secured to the frame 78 by a resilient strap 59a secured to a hollow arm 60a, the arm 60a being fixed to the frame 78. The tube 50 is vibrated by the vibrator 62 mounted to the discharge portion 53 thereof, and the concrete 82 immediately superjacent the discharge portion 53 is pressed downwardly by a smoothing element 84 similar to the element 66 of FIG. 2. This element 84 is secured to the frame 78 and is vibrated by a vibrator 86 identical to the vibrator 62. Thus, the concrete 82 between the tube portion 53 and the smoothing element 84 is continuously vibrated to achieve good consolidation of concrete about the embedded joint insert 42.

After the transverse channels 32 are provided every fifteen feet, for example, the paving machine 10 is moved out of the way and the apparatus of Fig. 5 is moved into position with the installer 74 located at the bottom of the canal side 67. The concrete 82 is then released, contemporaneously with upward travel of the installer 74, and flows downwardly about the tube 50 from the hopper 80. The machine 74 is driven upwardly along the inclined canal side 67 by any suitable motive means, details thereof being omitted for brevity.

As the machine 74 proceeds up the slope, the concrete 82 is laid in the channel 32 about the insert 42, while the element 84 presses the concrete 82 into position about the insert 42. During this operation the concrete 82 between the element 84 and the tube 50 is continually vibrated to effect good concrete consolidation about the insert 42.

Preferably the joint inserts 42 are placed in the transverse channels 32 shortly after the laying of the main concrete body 14 so that the two plastic concrete masses constituting the main body 14 and the concrete of the channel 32 will merge together and form a homogenous mass, as seen in FIG. 9.

From the above it is seen that the installer 74 operates on basically the same principle as the machine 10 except that the path or channel 32 is first formed and thereafter filled by the installer 74 from its own source of fresh concrete. However, in neither machine is the insert 42 forcibly driven or forced into freshly-laid concrete. Instead, the tube 50 smoothly lays the insert 42 simultaneously with pouring of concrete thereabout.

The insert 42 is initially anchored in position by nailing the free end thereof to a wooden anchor structure driven into the prepared base 12, for example. Thereafter, the length of joint insert 42 deployed behind the device 10 or 74, as the case may be, is such that the frictional engagement of the insert with the concrete tends to pull and maintain the downstream portion of the insert taut and in fixed position.

Figure 10:
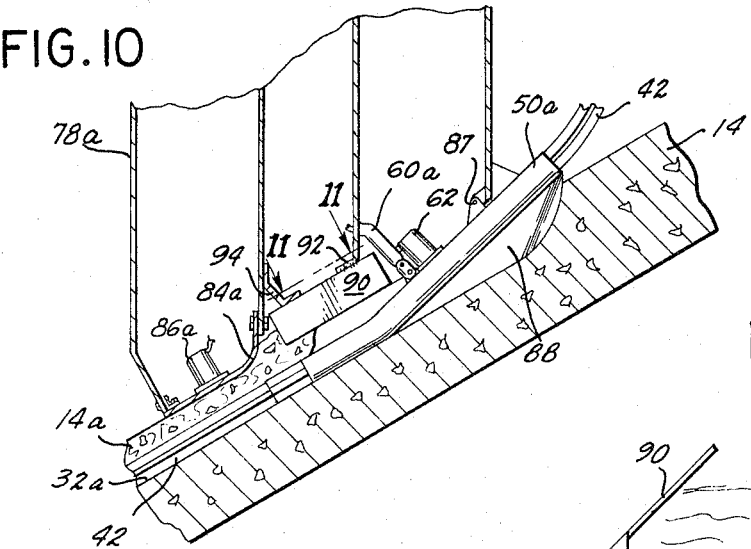
FIG. 10 is an enlarged longitudinal cross-sectional view of the joint insert laying tube of another form of apparatus according to the invention, and similar to the apparatus of FIG. 7, although not utilizing a second mass of concrete laid in the joint insert channel.
Figure 11:
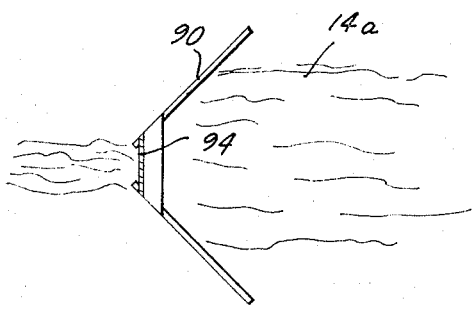
FIG. 11 is a detail plan view of the concrete smoothing device utilized in the apparatus of FIG. 10.

In FIGS. 10 and 11 there is illustrated another apparatus according to the present invention, and which is adapted to lay the joint insert 42 within a channel 32a formed by an arcuately configured plow blade 88 attached to and depending from a joint insert laying tube 50a. In this regard, the tube 50a cuts a path through already laid concrete 14, and no auxiliary supply of concrete is provided to fill the channel 32a, as will become apparent hereinafter.

The tube 50a is substantially identical to the previously described tube 50, except for the provision of the plow blade 88, and the tube 50a is inclined relative to the axis of the channel 32a to be formed in the concrete 14, and has its forward extremity pivotally secured at 87 to a frame 78a similarly supported and propelled in comparison with the previously described frame 78 of FIG. 7. The rearward extremity of the tube 50a is resiliently connected to a hollow support arm 60a by a resilient mounting strap 59a and the hollow support arm 60a is rigidly secured to the frame 78a. The vibrator 62 is operative to vibrate the rearward extremity of the tube 50a, which rearward extremity extends somewhat farther rearwardly compared to the joint insert laying tubes previously described. Such extension disposes the rearward extremity of the tube 50a beneath a V-plow smoother 90 which is rigidly secured to the frame 72a by brackets 92 and 94. The smoother 90, as best viewed in FIG. 11, smooths the concrete 14a which has been pushed aside by the blade 88 and tube 50a, gathering such concrete 14a and causing the same to converge beneath an arcuate smoothing element 84a secured to the frame 78a immediately superjacent the rearward end of the tube 50a.

A vibrator 86a is attached to the element 84a and is operative, along with the vibrator 62, to vibrate the surplus concrete 14a disposed in the throat or Venturi area between the smoothing element 84a and the rearward extremity of the tube 50a. This establishes good consolidation of the concrete about the irregular configuration of the joint insert 42.

Figure 12:
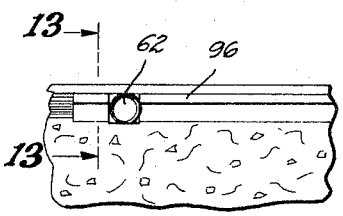
FIG. 12 is a detail, fragmentary plan view of the joint insert laying tube of the apparatus of FIG. 10.

Referring now to FIGS. 12 through 14, there is illustrated a different form of joint insert laying tube 96 which is L-shaped in transverse section whereby it is adapted to embed a normally horizontally disposed sealing element 98 characterized by laterally extending or horizontal portions 46a for water sealing, but absent plane joint weakening vertical portions. Such vertical portions are unnecessary in view of the fact that the sealing joint insert 98 is used only at construction joints 100 formed by a usual side form 102 or the like.

More particularly, where two slabs of concrete are to be joined together one of the slabs is generally first formed and its boundary established by a form such as the side form 102. The next slab is then cast alongside the first slab, and with some provision for water sealing therebetween.

The sealing joint insert 98 is laid or embedded in the concrete 14, in the deformed, L-shape configuration shown in FIG. 13, at the time that the concrete 14 is being poured, as with the apparatus illustrated in FIGS. 1 through 4, the laying tube 96 being mounted by a suitable bracket 50b to a cylindrical tube otherwise identical to the laying tube 50 of FIG. 2. The vibrator 62 is operative to vibrate the laying tube 96, as will be apparent.

After the laying tube 96 has positioned the joint insert 98 as illustrated, it will be apparent that upon removal of the side form 102, the resilience of the joint insert 98 will permit the upstanding portion of the insert, as viewed in FIG. 13, to deploy itself into a substantially horizontal position in substantial horizontal alignment with the other embedded portion of the insert, as best viewed in FIG. 14. In this position the joint insert 98 is ready for bonding to an adjacent concrete slab.

Although reference herein has been made to the laying of concrete, it will be apparent that the principles of the present invention are equally applicable to the installation of joint inserts in other plastic materials, such as asphalt and the like.

Various modificaitons and changes may be made with regard to the foregoing detailed description without departing from the spirit of the invention or the scope of the following claims.

We claim:

1. Apparatus for providing a joint in concrete laid upon a prepared base, said apparatus comprising:
    a frame movable forwardly over said prepared base;
    a smoothing element carried by said frame and having a downwardly and rearwardly directed portion for forcing concrete downwardly;
    an elongated joint insert laying tube having a passage for receiving a joint insert and further having a discharge portion spaced immediately below said portion of said smoothing element for discharging the joint insert for embedment in the plastic concrete as said apparatus moves forwardly;
    and vibration means for vibrating said smoothing element and said discharge portion whereby plastic concrete passing through the space therebetween tends to consolidate about said discharge portion and about the discharged joint insert.

2. Apparatus for providing a joint in concrete laid upon a prepared base, said apparatus comprising:
    a frame movable forwardly over said prepared base;
    a concrete supply means carried by said frame for deposit of fresh plastic concrete;
    a smoothing element carried by said frame and having a downwardly and rearwardly directed portion for forcing concrete downwardly;
    an elongated joint insert laying tube having a passage for receiving a joint insert and further having a discharge portion spaced immediately below said portion of said smoothing element for discharging the joint insert for embedment in the plastic concrete as said apparatus moves forwardly, said tube further including a portion in advance of said discharge portion and in the path of plastic concrete passing from said supply means to thereby prevent the plastic concrete from flowing into the space subsequently to be occupied by the joint insert;
    and vibration means for vibrating said smoothing element and said discharge portion whereby plastic concrete passing through the space therebetween tends to consolidate about said discharge portion and about the discharged joint insert.

3. Apparatus for providing a joint in concrete laid upon a prepared base, said apparatus comprising:
    a frame movable forwardly over said prepared base and including a channel forming plow for displacing plastic concrete to form a channel;
    an elongated joint insert laying tube for travel through said channel and having a passage for receiving a joint insert and further having a discharge portion for discharging the joint insert into said channel as said apparatus is moved forwardly;
    means for vibrating said tube;
    a first smoothing element carried by said frame above said discharge portion for smoothing concrete displaced by said plow into said channel and upon said discharge portion;
    a second smoothing element spaced rearwardly of said first smoothing element and immediately above said discharge portion, and having a downwardly and rearwardly directed portion to exert pressure upon concrete between said second smoothing element and said discharge portion;
    and second means for vibrating said second smoothing element to consolidate concrete about said discharge portion and about the discharged joint insert.

4. Apparatus for providing a sealing insert in concrete laid upon a prepared base adjacent a side form defining a construction joint, said apparatus comprising:
    a frame movable forwardly over said prepared base;
    a smoothing element carried by said frame and having a downwardly and rearwardly directed portion for forcing concrete downwardly;
    an elongated, L-shaped sealing insert laying tube having an L-shaped passage for receiving a sealing insert and further having a discharge portion spaced immediately below said portion of said smoothing element for discharging the sealing insert in a deformed, L-shape configuration for embedment of the horizontal portion of the L-shape insert in the plastic concrete with the vertical portion of the insert located adjacent the side form defining the construction joint;

and vibration means for vibrating said smoothing element and said discharge portion whereby plastic concrete passing through the space therebetween tends to consolidate about said discharge portion and about the horizontal portion of the L-shape joint insert.

5. Apparatus for providing a joint in concrete laid upon a prepared base, said apparatus comprising:

a frame movable forwardly over said prepared base;

a concrete supply means carried by said frame and including a discharge section for deposit of fresh plastic concrete under a pressure head;

a smoothing element carried by said frame rearwardly of said discharge section and having a downwardly and rearwardly directed portion for forcing concrete downwardly;

an elongated joint insert laying tube having a passage for receiving a joint insert, and having a discharge portion spaced below and immediately adjacent said discharge section and said smoothing element for submergence in the plastic concrete to discharge the joint insert in the plastic concrete under a pressure head, and further having a portion in advance of said discharge portion and in the path of plastic concrete being deposited on said prepared bed to thereby prevent the plastic concrete from flowing into the space subsequently to be occupied by the joint insert;

and means for vibrating said tube to consolidate concrete around all portions of the deposited joint insert.

References Cited by the Examiner
UNITED STATES PATENTS

| | | | |
|---|---|---|---|
| 1,750,107 | 3/1930 | Heltzel | 94—39 |
| 1,974,240 | 9/1934 | Heltzel | 94—39 |
| 1,982,387 | 11/1934 | Heltzel | 94—45 |
| 2,123,989 | 9/1938 | Day | 94—46 |
| 2,225,015 | 12/1940 | Lebelle | 94—46 |
| 2,332,688 | 10/1943 | Bailey | 94—46 |
| 2,961,731 | 11/1960 | Buzzell | 94—18 X |
| 3,022,713 | 2/1962 | Friberg | 94—39 X |
| 3,161,117 | 12/1964 | Supject | 94—46 |

JACOB L. NACKENOFF, *Primary Examiner.*